U.S. Patent Number: 4,573,619
Date of Patent: Mar. 4, 1986

Grant

[54] TAPE GUIDE MECHANISM FOR DYNAMIC TRACKING CONTROL

[75] Inventor: Frederic F. Grant, Bellflower, Calif.

[73] Assignee: Eastman Kodak Company, Rochester, N.Y.

[21] Appl. No.: 717,204

[22] Filed: Mar. 28, 1985

[51] Int. Cl.[4] .......................................... B65H 27/00
[52] U.S. Cl. ..................................... 226/190; 226/10; 226/45; 226/174; 226/196; 242/76; 360/70; 360/77
[58] Field of Search ............... 226/190, 194, 196, 197, 226/198, 200, 199, 10, 15, 18, 44, 102, 168, 174; 242/76, 189, 190, 186; 360/69, 70, 75, 77, 76

[56] References Cited

U.S. PATENT DOCUMENTS

| | | | |
|---|---|---|---|
| 3,114,489 | 12/1963 | Legler | 226/3 |
| 3,643,849 | 2/1972 | Roberts | 226/199 |
| 3,768,717 | 10/1973 | Salcedo | 226/198 |
| 4,044,388 | 8/1977 | Metzger | 360/70 |
| 4,120,008 | 10/1978 | Metzger | 360/70 |
| 4,150,773 | 4/1979 | Fell et al. | 226/196 |
| 4,184,181 | 1/1980 | Mijatovic | 360/77 |
| 4,297,931 | 11/1981 | Lessard | 83/397 |
| 4,403,720 | 9/1983 | Grant | 226/190 |

Primary Examiner—Stanley N. Gilreath
Attorney, Agent, or Firm—Dennis P. Monteith

[57] ABSTRACT

A tape guide mechanism includes an edge-guide element extending radially from a central axis. A tape guide roller, rotatable about the central axis, is arranged for urging an advancing magnetic tape laterally in the direction of the edge-guide element, to maintain an edge of the tape perpendicular to and in continuous contact with the edge-guide element during tape transport movement. A piezoelectric actuator, preferably comprising a stack of flexing type bimorph elements responsive to a voltage signal relating to the direction and magnitude of a tape-tracking error, causes movement of the edge-guide element in a single composite direction having a first component which is perpendicular to the edge of the tape, and a second component, which is parallel to the tape edge. Thus, the tape is caused to move laterally in either direction for tracking control, in one direction under the influence of perpendicular movement of the edge-guide element toward the tape, and in the opposite direction under the urging of the guide roller, to follow perpendicular movement of the edge-guide element away from the tape.

8 Claims, 9 Drawing Figures

FIG. 1

PRIOR ART

TAPE GUIDE MECHANISM FOR DYNAMIC TRACKING CONTROL

BACKGROUND OF THE INVENTION

1. Field of the Invention

The present invention relates to apparatus for guiding magnetic tape. In particular, the invention relates to a tape guide mechanism for dynamic tracking control in the presence of transient tracking errors.

2. Description Relative to the Prior Art

In the following description of the relevant prior art, reference is made to FIG. 1, of the accompanying drawings, which is an elevation view partially in section, of a tape guide mechanism known in the art.

With reference to the magnetic tape recording art, tracking is the process of keeping a playback head on the path of a track already recorded on magnetic tape. The purpose of tracking control is to adjust the position of the playback head relative to the record track or vice versa, so that the playback head is aligned with the record track for maximum signal-to-noise output.

To facilitate tracking, tape guides, which serve to keep the tape laterally straight, are normally strategically placed, for example, at the entrance and exit point of the record/playback heads. One particularly preferred type of tape guide includes means for producing a slight lateral force in one direction, for maintaining a given edge of an advancing tape in continuous contact with a fixed reference surface, without damaging the tape edge or buckling the tape.

U.S. Pat. No. 4,403,720, which is assigned to the assignee of the present invention, discloses a tape guide of this general type. The basic components of such a tape guide 10, which is shown in FIG. 1 of the drawings, are as follows. The tape guide 10 has a post 12 for supporting a hollow tape guide roller 14. The post 12 is shown in FIG. 1 as attached to and extending vertically from a baseplate 16. The post 12 may extend at any other angle and may, if desired, have the form of, or be replaced by, a rotatable shaft or similar device.

The tape guide 10 includes a sleeve 18 surrounding the post 12 inside the guide roller 14. The sleeve 18 has an inside diameter that is larger than the outside diameter of the post 12, for receiving an O-ring 24 between the post and the sleeve. The O-ring 24, which is seated in a peripheral groove 26 on the post 12 and a corresponding groove on the sleeve 18, serves as a fulcrum to provide tilting motion of the sleeve relative to the plane 28 of the O-ring.

Ball bearings 30, which are arranged in races 32 on opposing sides of the plane 28 of the O-ring 24, couple the guide roller 14 to the sleeve 18 so that the guide roller is rotatable about the sleeve. Thus, the spaced bearings 30 mount the tape guide roller 14 for rotation about the post 12 and tilting motion with the sleeve 18.

A tape guide flange 34, which has a reference surface 36 extending radially from the post 12, is precisely positioned on the post 12, adjacent one end of the tape guide roller 14, to control the lateral position of tape (not shown). In practice, the reference surface 36 is a layer or stratum of ceramic or other hard material, and may be rotatable or non-rotatable.

While the tape guide 10 is generally applicable to guiding magnetic tape through a recorder, it is particularly well adapted for controlling the lateral position of the tape as it advances past a head stack consisting of a plurality of closely spaced record/playback heads. In this configuration, tape guide 10 is positioned immediately before the head stack so that an advancing tape wraps partially around the tape guide roller 14. The tape guide 10 is positioned so that the reference surface 36 is parallel to the tape transport direction, with the centerline, denoted 38, of the advancing tape being offset a distance, denoted d, with respect to the plane 28 of the O-ring 26, in the direction of the guide flange 34.

The tape approaches the tape guide 10 tangential to the surface of the roller 14. If the edge of the tape is not in contact with the guide flange 34, the roller 14 tilts with the sleeve 18, because of the offset of the centerline 38 of the tape from the O-ring 26. In response to this tilting movement, the tape moves axially in the direction of the flange 34. When the edge of the tape engages the reference surface 36, the tape transport direction becomes parallel to the surface 36 again.

Figure 1:
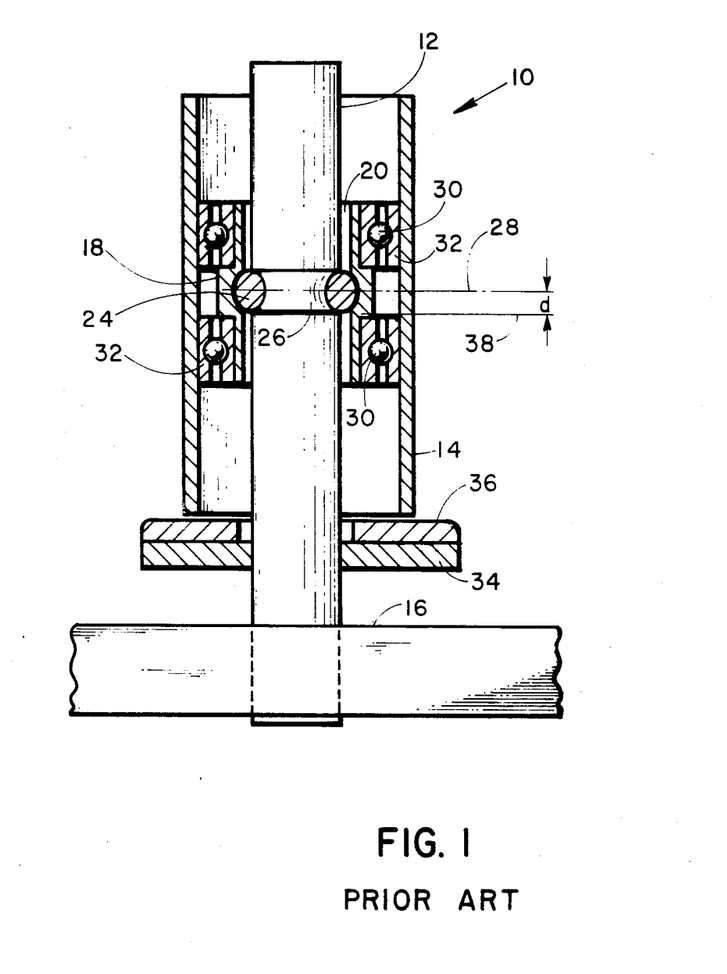
FIG. 1 is an elevation view, partly in section, of a known tape guide mechanism.

In practice, the tape guide 10 of FIG. 1 maintains an edge of the tape generally perpendicular to and in continuous contact with the reference surface 36 during tape transport movement. The forces acting on the tape from the fulcrum effect of the O-ring 26 and its offset are balanced with the forces acting on the tape from the guide flange 34.

U.S. Pat. No. 4,150,773 discloses an alternative arrangement for guiding a tape with an edge thereof in continuous contact with a reference surface. To decrease forces acting on the edge of the tape, and thus prevent damage to the tape, a rotatable tape-contacting surface has a plurality of spaced, parallel rings of rubber, the rings being inclined toward a tape guide flange. In response to tape advancing movement, the rings in contact with the tape deflect. Because of the coefficient of friction of tape on the rings, the tape moves with the rings toward the flange, whereby an edge of the tape is maintained generally perpendicular to and in continuous contact with a stationary reference surface of the flange. The rings of the rotatable surface return to their nominal radial position when not engaged by the advancing tape.

There are a variety of standard magnetic tape recording formats currently used commercially. For example, one standard tape recording format presently used in the United States, includes 14 parallel record tracks. With a 1-inch wide tape, each track has a track pitch of 70 mils (50 mils record track width and 20 mils guardband width). Tape guides of the type disclosed in the above-mentioned patents provide acceptable tracking control for this recording format and other formats in which the track pitch is of comparable size.

A general problem arises however when prior art tape guides are used for tracking control of information that is recorded on even more closely spaced record tracks. For example, other magnetic tape recording systems use one or more recording heads which sweep transversely across a magnetic tape at high speed, as the tape is moving. With some of these systems, a track pitch as small as 1.2 mils (1.0 mil record track width and 0.2 mil guardband width) may be used. Thus, even a small deviation in alignment of the tape as it passes over a playback head, compared to passing over a record head, may either result in significant loss of playback signal strength, or playback of the wrong track.

A further problem arises when playback of narrow-width record tracks occurs on apparatus that is different than the apparatus that was used for recording. In this situation, precision tracking control has been found to be even more necessary because of both static and dynamic sources of tracking error including mechanical tolerance build-up inherent in different playback apparatus, variations in the scanning surface and the scanning plane of the playback head, variations in track centerline locations, and other secondary considerations such as changes in tape tension because of temperature and humidity variations.

With the various tape guides known in the prior art, tracking control of narrow-width record tracks may be achieved effectively, at least in theory, when a tracking error source is static, or when the error source is only slowly varying with time, such as when the dimensions of the tape change with humidity and temperature. This is because a static or bias error can be compensated during playback by operator adjustment of the playback apparatus.

However, when a tracking error source exists which is changing more rapidly and is thereby transient, such as when one phase of a scanning surface during playback is different from the corresponding phase of the scanning surface during recording, mistracking results that can not be corrected effectively by operator adjustment. When the record tracks are of a relatively narrow width, significant loss of playback signal may occur. Accordingly, prior art tape guides suffer from a disadvantage in that they are not suitable for tracking control of narrow-width record tracks in the presence of transient tracking errors.

SUMMARY OF THE INVENTION

In view of the foregoing, an object of the invention is to provide for dynamic adjustment of a tape guide so that a record track of a magnetic tape is automatically aligned with a corresponding playback head for maximum signal-to-noise output. This object is achieved with a tape guide of a known type including an edge-guide element extending radially from a central axis, and a roller, responsive to the wrapping of an advancing tape partially around the roller, for applying an axial force to the advancing tape to move the tape laterally in the direction of the edge-guide element, to maintain a predetermined edge of the tape in continuous contact with the edge-guide element during tape transport movement. In accordance with the invention, an improved tape guide of this type is characterized in that the edge-guide element is mounted for axial movement relative to the roller. An energizable element having an output arranged for movement in response to a tracking-error voltage signal, causes axial movement of the edge-guide element relative to the roller in accordance with the movement of the output of the energizable element. Thus, the tape is caused to move laterally in either direction for tracking control, in one direction, under the influence of axial movement of the edge-guide element toward the roller, and in the opposite direction, under the urging of the roller, to follow movement of the edge-guide element away from the roller.

In a preferred embodiment of the invention, the energizable member comprises a piezoelectric bimorph element arranged for bidirectional bending movement in response to the tracking-error signal. The bimorph element is coupled to the edge-guide element so that bending movement of the bimorph element causes corresponding axial movement of the edge-guide element. The magnitude of the bending movement of the piezoelectric element is related to the amplitude of the tracking-error voltage signal and the direction of the bending movement is determined by the polarity of the signal, the amplitude and polarity corresponding respectively to the magnitude and the direction of the deviation of a magnetic head from a desired track centerline position.

Preferably, the edge-guide element is mounted to maintain normal contact with the tape, independently of the voltage applied to the bimorph element. A particularly preferred embodiment includes parallel cantilevered flexure beams, the free ends of which are attached respectively to top and bottom surfaces of an edge-guide mounting block, to constrain the free ends of the beams to parallel planes. The mounting block moves axially in reponse to bending movement of the bimorph element. The parallel beams flex, in response to movement of the block, in a configuration that constrains the mounting block to a fixed, upright position. This limits movement of the block to a single composite direction having a first axial component, which maintains the edge-guide element perpendicular to the edge of the tape, and a second radial component, parallel to the tape edge.

The roller and the edge-guide element are arranged with respect to each other to maintain the edge of the tape against the edge-guide element, regardless of the direction in which the bimorph element is bent. When the bimorph element causes the edge-guide element to move away from the tape, the roller causes the tape to move laterally to follow the edge-guide element. When the edge-guide element is moved in the opposite direction toward the tape, the rigidity of the tape and the yieldable nature of the roller permit the tape to move laterally under the urging of the edge-guide element, without buckling or otherwise damaging the tape.

The invention, and its other advantages, will become more apparent in the detailed description of a preferred embodiment presented below.

DESCRIPTION OF THE DRAWINGS

In the detailed description of preferred embodiments of the invention presented below, reference is made to the accompanying drawings, in which.

DETAILED DESCRIPTION OF PREFERRED EMBODIMENTS OF THE INVENTION

The invention is most effective when used in combination with a tape guide of the aforementioned type that produces an axial force for urging a magnetic tape laterally in one direction, to maintain one edge of the tape in continuous contact with an edge-guide element during tape transport movement. Preferably the desired force is just enough to prevent substantial engagement forces between the edge of the tape and the edge-guide element, to avoid damaging the tape edge or buckling the tape during tape advancing movement. However, unlike the tape guide apparatus of the prior art, the present invention provides for dynamic tracking control by electrically controlling the axial position of the edge-guide element, whereby the tape is caused to move laterally in either direction in accordance with the axial position of the edge-guide element.

Figure 2:
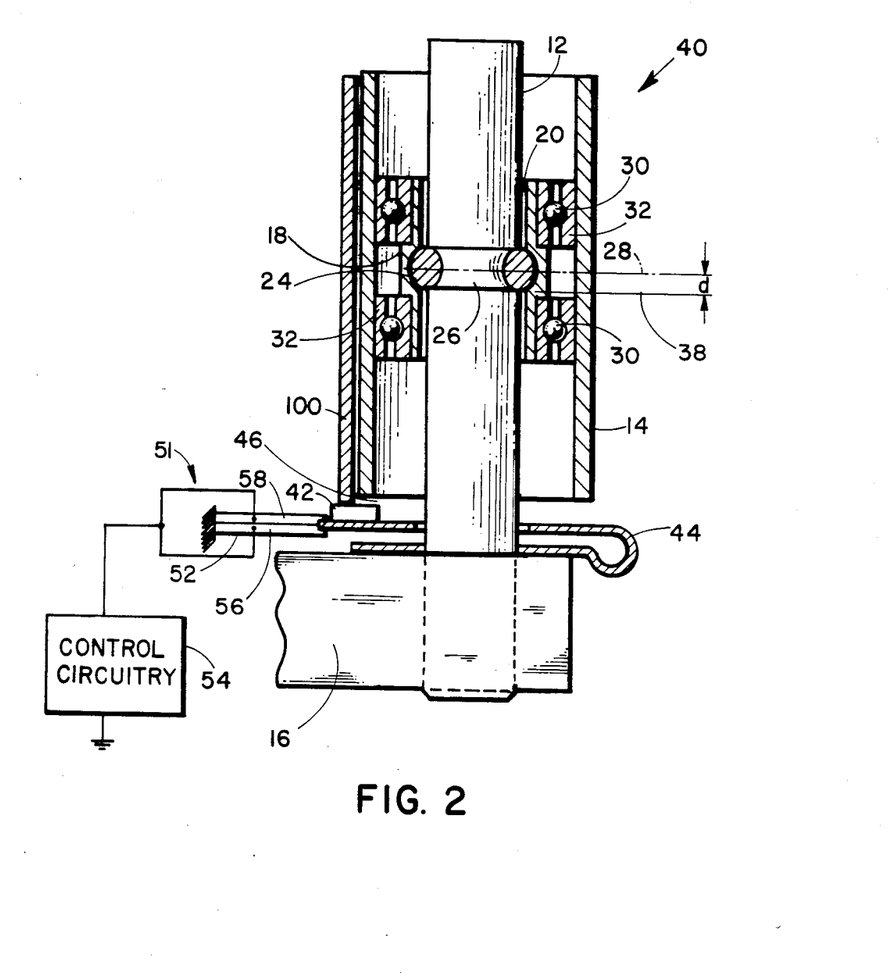
FIG. 2 is an elevation view, partially in section, of a tape guide mechanism according to the present invention.

FIG. 2 illustrates a preferred embodiment of a tape guide 40 according to the present invention. Elements of FIG. 2 which are common or substantially similar to tape guide elements of FIG. 1 are identified by like numerals.

Figure 3:
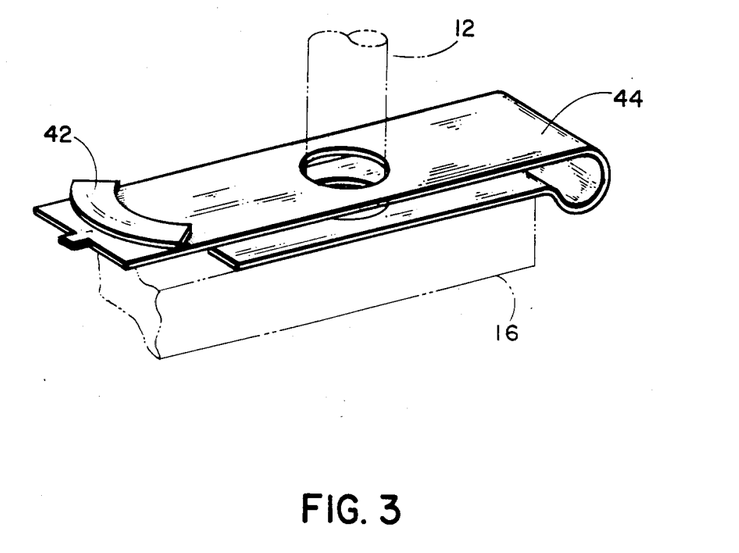
FIG. 3 is a perspective view of a flexure hinge for mounting an edge-guide element of the tape guide mechanism of the present invention.

To move a magnetic tape 100 laterally in either direction, the invention requires that the tape guide flange 34 of FIG. 1 be replaced by an edge-guide element 42 mounted for axial movement in either direction. For that purpose, the element 42 is secured to a flexure hinge 44, also shown in FIG. 3, which is attached to the baseplate 16 by suitable means such as screws or cement. A nominal position of the element 42 provides a clearance, denoted 46, to allow for the element to move toward the roller 14. Bearing in mind that tracking control corrections usually are less than one track pitch, the clearance 46 may be on the order of only a mil or so for tracking control of closely spaced record tracks.

The invention further requires that means are provided for moving the element 42 automatically in either axial direction. Preferably, the means are responsible to an electrical signal that is functionally related to the magnitude and the direction of a playback head tracking error. For that purpose, a preferred embodiment of the invention includes a piezoelectric actuator 51 in the form of a flexing type bimorph element 52, connected to the end of the flexure hinge 44 carrying the element 42. The element 52 is arranged for bending movement in response to a tracking error signal, for causing axial movement of the edge-guide element 42 in accordance with the bending movement of the bimorph element 52. The voltage error signal is applied by control circuitry 54, an embodiment which is described in detail with respect to FIG. 9.

Piezoelectricity is a well known phenomenon exhibited by certain crystals and ceramic elements. When a piezoelectric element is compressed or extended in a particular direction, electric charges of opposite signs are produced at opposite ends of the element. Not only is an electric moment induced in a piezoelectric element by an application of mechanical stress or strain, there is also an inverse effect. That is, on applying an electric field, the element changes shape by expansion in one direction and contraction in another. A fuller discussion of the direct and inverse effects may be found in *Encyclopaedic Directory of Physics*, Pergamon Press, 1962, pages 503–505.

The flexing-type bimorph element 52 of FIG. 2 is comprised of two aligned strips of piezoelectric material 56 and 58, with the direction of expansion of the strip 56 aligned with the direction of contraction of the strip 58 and vice versa. Suitable adhesive means (not shown), such as epoxy, join the strips 56 and 58 together at their interface.

Bending movement of the bimorph element 52 is translated into axial movement of the edge-guide element 42, as follows. When a voltage signal is applied of a polarity that causes expansion of the strip 56 and thereby contraction of the strip 58, the free or movable end of the element 52 moves the flexure hinge 44 upwardly, thereby urging the element 42 axially in the direction of the guide roller 14. Conversely, when an applied voltage is of the opposite polarity, the element 52 flexes the hinge 44 downwardly, thereby pulling the element 42 axially in a direction away from the guide roller 14. Until either voltage is removed, the bimorph element 52 remains bent.

Figure 4:
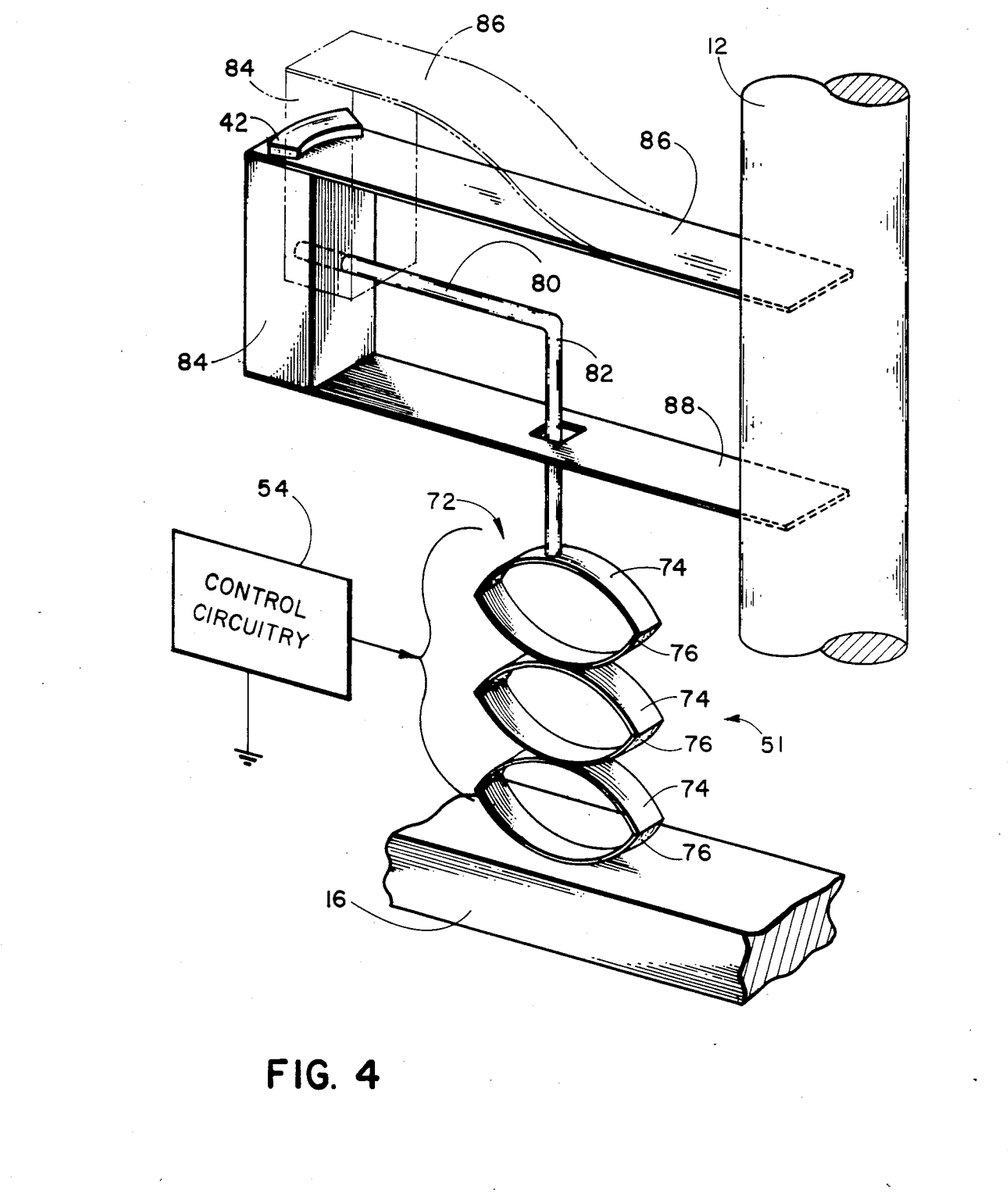
FIG. 4 includes an alternate preferred embodiment for movably positioning the edge-guide element of FIG. 2.

FIG. 4 illustrates an alternate preferred embodiment of the invention for movably positioning the edge-guide element 42. A particular advantage of the piezoelectric actuator 51 of FIG. 4 is that it provides bending movement that is amplified in response to a given level of applied voltage, for providing a correspondingly greater axial movement to the edge-guide element 42. For that purpose, the actuator 51 includes a stack of bimorph elements 72, three of which are shown electrically connected in parallel to the output of the aforementioned circuitry 54.

Each element 72 in the stack consists of a mating pair of curved strips 74 and 76 joined together at their ends so that the direction of expansion of the strip 74 is aligned with the direction of contraction of the strip 76 and vice versa. Central portions of adjacent elements 72 are securely joined to each other, by suitable means, so that the elements 72 are mechanically connected in series, to the baseplate 16.

Bending movement of the actuator 51 in response to an applied voltage occurs as follows. When a voltage is applied of a polarity that causes the contracting of the strips 76, and thereby the expanding of the strips 74, each of the strips 76 flexes inwardly. This inward movement increases the curvature of the corresponding strip 74, and thereby pushes its central portion upwardly. This upward movement is further enhanced with the contemporaneous expansion of the strip 74.

Accordingly, the strip 74 of the element 72 attached to the baseplate 16 flexes upwardly a given amount, in accordance with the magnitude of the applied voltage. Because the other elements are serially connected, each of the other elements 72 in the stack moves upwardly by the given amount multiplied by its position in the stack. That is, the uppermost element 72 in the stack moves three times the distance of the first of the elements 72 in the stack, etc.

When an applied voltage is of the opposite polarity, each of the strips 76 expand, and thereby flex outwardly. This outward movement reduces the curvature of the strips 74, and thereby pulls the strips 74 downwardly. With the contemporaneous contracting of the strips 74, this downward movement is amplified. Accordingly, the expanding of the strips 76 and the contracting of the strips 74 cause each of the elements 72 to flex downwardly, with the total amount of downward movement of each of the elements 72 being related to its position in the stack.

A cantilevered rigid beam 80, attached to the output of the piezoelectric actuator 51 by means of a link 82, causes axial movement of an edge-guide mounting block 84 in response to deflecting movement of the piezoelectric actuator. Parallel cantilevered flexure beams 86 and 88, coupling the block 84 to the post 12, prevent lateral movement of the edge-guide element 42 under the influence of advancing movement of the tape.

The beams 86 and 88 are further arranged to prevent tilting of the block 84 when it is moved axially, to maintain normal contact between the tape-engaging surface of the element 42 and the tape, independently of the voltage applied to the piezoelectric actuator 51. For that purpose, the free ends of the beams 86 and 88 are attached to and across respectively the top and bottom surfaces of the mounting block 84, to constrain the free ends of the flexure beams to planes that are parallel to each other.

When the mounting block 84 moves axially under the influence of bending movement of the bimorph element 72, the beams 86 and 88 flex in a configuration that constrains the mounting block to an upright position, parallel with the post 12. When the bimorph elements 72 are actuated, either up or down, the block 84 moves in a composite direction having a first axial component perpendicular to the edge of the tape, and a second radial component parallel to the tape edge, in the direction of the post 12. The radial displacement of the block 84 is illustrated in FIG. 4 when the edge-guide element 42 is moved upwardly. Of course, the width of the element 42 is selected so that the edge-guide element is not moved radially inwardly beyond the surface of the guide roller 14.

Figure 5:
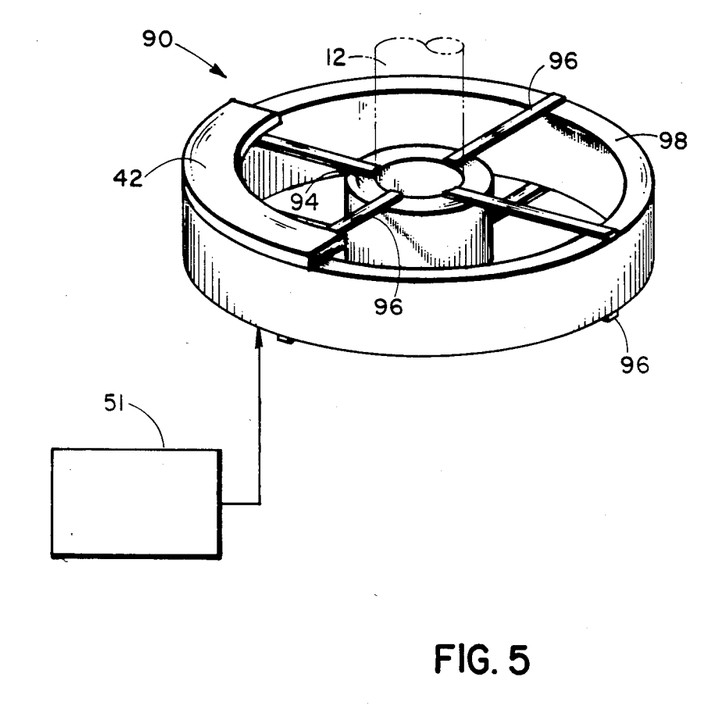
FIG. 5 is a perspective view of an alternate embodiment for movably mounting the edge-guide element.

FIG. 5 illustrates a wheel-like element 90 for axially moving the edge-guide element 42, without any tilting component. An inner ring 94, which is attached to the post 12, serves as a hub, and an outer ring 98, serves as a rim, supporting the edge-guide element 42. Radially extending, relatively narrow spoke-like strips 96 are attached to corresponding upper and lower surfaces of the inner ring 94 and the outer ring 98, to prevent the outer ring from tilting relative to the inner ring.

The ring 98 may be moved axially, relative to the ring 94, by actuating one side of the rim or the other with the piezoelectric actuator 51. A further advantage of the element 90 is that the ring 98 enables the edge-guide element 42 to extend circumferentially with respect to the guide roller 14.

To provide for dynamically adjusting the lateral position of a magnetic tape, the tape guide 40 of the present invention should be used with a tracking control system that can provide a tracking-error voltage signal which is a measure of the deviation of a playback head from a track centerline position and which indicates the direction of the deviation.

There are various tracking control systems known in the magnetic recording art that provide a tracking-control error signal corresponding to the magnitude and the direction of misalignment of a magnetic head with respect to a reference ine of an associated information-bearing record track. The systems disclosed in U.S. Pat. Nos. 4,044,388, 4,120,008, 4,184,181 and 4,297,931 are exemplary of tracking control apparatus for use with a video recorder.

Figure 6:
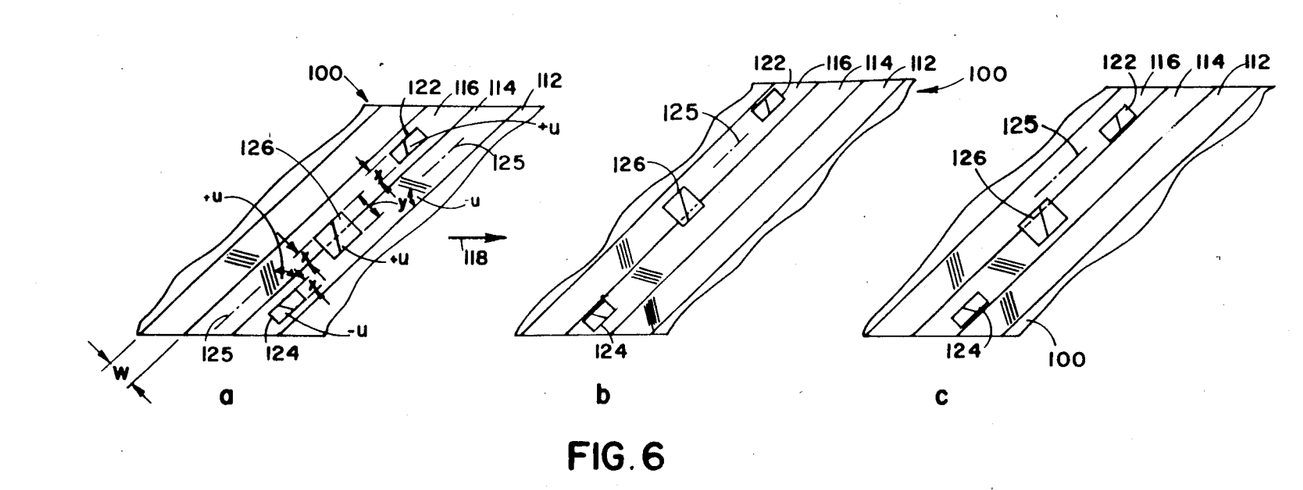
FIG. 6 is a diagrammatic illustration of three tracking conditions of tracking control apparatus for use with the tape guide mechanism of the present invention.
Figure 7:
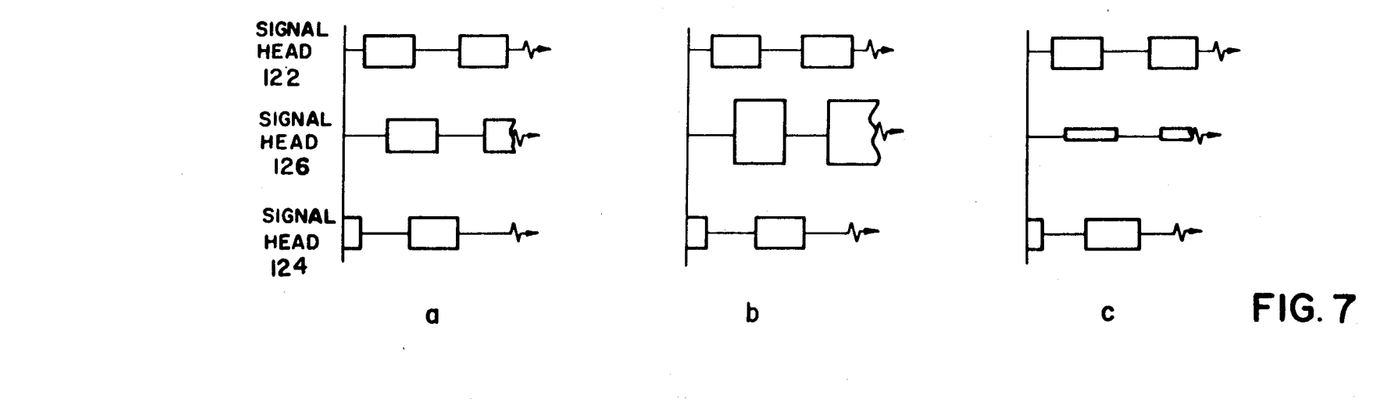
FIG. 7 illustrates the envelopes of playback signals corresponding to the three tracking conditions of FIG. 5.

FIGS. 6 and 7 illustrate tracking control apparatus of the type disclosed and claimed in copending U.S. patent application of Joseph Serafini, Ser. No. 689,406, filed Jan. 7, 1985, which is assigned to the assignee of the present invention. The tracking control apparatus disclosed therein is not limited to tracking of predetermined signals, such as video signals, as is the case with the tracking control apparatus of the above-identified patents, and therefore offers particular advantages for use with the tape guide 40 of the present invention.

FIG. 6 illustrates the magnetic tape 100, having signals recorded thereon in parallel, oblique tracks. In this figure, three adjacent signal tracks 112, 114 and 116 are aligned in the direction of tape movement, denoted by the arrow 118. As illustrated by the phantom lines, adjacent edges of adjacent tracks coincide so that guard bands on the tape 100 are eliminated. It will be understood that this side-by-side arrangement of the record tracks of FIG. 6 is for illustration only. As made apparent hereinbelow, adjacent tracks may actually overlap to some degree, or may be separated by a guard band.

To limit cross talk between adjacent record tracks, alternating tracks have information recorded at mutually different azimuth angles. These different azimuth angles are illustrated in FIG. 6a in that recorded information is represented by groups of closely spaced parallel lines. The information on one track, i.e. track 112, is recorded with a record head, the gap of which is oriented in azimuth at an angle of $+u$ and the next track, i.e. track 114, the information is recorded at an azimuth angle of $-u$, then on track 116 an angle of $+u$, etc.

The magnetic heads used in playback must, of course, also have gaps oriented in azimuth corresponding to the azimuth angle of the recorded information. Accordingly, FIG. 6 illustrates a pair of playback heads 122 and 124. The playback head 122 has an azimuth angle of $+u$, as diagrammatically illustrated, corresponding to the azimuth angle of signals recorded on track 112 and track 116, and other alternating tracks (not shown). Likewise, the playback head 124 has an azimuth angle of $-u$, corresponding to signals recorded on track 114 and alternating tracks (also not shown).

The tracking control apparatus of FIG. 6 requires that a playback head may stray from a reference line, such as track centerline 125, a limited amount, without the attenuating of its playback signal. To prevent signal loss when limited track misalignment occurs, the playback head 122 has a track-wise width, X, that is narrow relative to the width, W, of the record tracks. The narrow track-wise width of the head 122 permits limited displacement from track centerline 125, without the playback head 122 extending beyond the borders of its respective record tracks, which would cause signal attenuation.

Preferably, both the playback head 122 and the playback head 124 have a track-wise width X which is one-half of the track width W. Thus, both playback heads 122 and 124 may stray from track centerline 125 one-fourth of the width W without appreciably attenuating their playback signals.

The tracking control apparatus of FIG. 6 further produces a tracking control signal that is directly dependent on the position of the playback head 122 relative to the centerline 125 of its associated record tracks. For that purpose, there is provided a tracking control head 126, which has an azimuth angle of $+u$. The head 126 is mounted with respect to the playback heads 122 and 124 so as to overlap a given portion of each record track when the playback heads 122 and 124 are aligned with the centerlines 125 of their associated record tracks. Similarly, when the playback heads are misaligned relative to their respective track centerlines 125, the control head 126 overlaps one of the record tracks by a greater amount, and overlaps the adjacent record track by a correspondingly lesser amount. The direction that the playback heads 122 and 124 are misaligned determines which track is overlapped by more of the control head 126 and which track is overlapped by less of the control head.

The tracking control head 126 has a track-wise width, Y, that is wide relative to the track-wise width X of the playback heads. Preferably, the width Y of the control head 126 is equal to the width W of the record tracks. Accordingly, when the playback heads 122 and 124 are tracking their centerlines accurately and the edges of adjacent tracks coincide, the control head 126 overlaps each track by the amount X, the width of the playback heads.

Although the control head 126 is mounted to overlap adjacent +u and −u record tracks, signal flux from the −u record track is negligible because the output of the head 126 is influenced essentially only by flux from the +u record track. Thus, the amplitude of the tracking control signal is directly proportional to the amount that the head 126 overlaps a +u record track, for a head whose output varies linearly with width.

FIG. 6 also illustrates three tracking alignment conditions relating to the playback of recorded information, and FIG. 7 illustrates the corresponding effect each of these conditions has on the signals produced by the playback heads 122 and 124 and the tracking control head 126. As shown in FIG. 6a, wherein the playback head 122 and the playback head 124 are exactly centered on their respective tracks, the tracking control head 126 is positioned to overlap the tracks 114 and 116 the same amount, which is the track-wise width X of the playback heads 122 and 124. When this condition exists, corresponding FIG. 6a shows that the envelope of the signal from the head 126 is approximately equal to the envelope of the signal from the head 122.

FIGS. 6b and 6c and corresponding FIGS. 6b and 6c illustrate respectively two ways in which mistracking occurs and how corresponding playback head and control track head output signals vary. FIG. 6b illustrates a condition in which the playback heads 122 and 124 stray from a track centerline position toward the left hand edge of their respective record tracks, as viewed in the drawing. When this tracking condition exists, the amplitudes of the signals produced by the playback heads 122 and 124 would not change because the relatively narrow playback heads still overlap their respective record tracks by the same amount as when they were exactly centered on their tracks. However, as shown in FIG. 6a, the amplitude of the signal produced by the tracking control head 126 would increase because of the corresponding increase in the amount that the head 126 overlaps the +u record track 116.

FIG. 6c illustrates the playback heads 122 and 124 when they stray to the opposite side of their respective record tracks. In this condition, there is still no change in the strength of the signals from the playback heads. However, because the tracking control head 126 now overlaps more of the −u record track 114 and less of the +u record track 116, a corresponding decrease in the amplitude of the signal from the head 126 occurs.

During playback, the tape 100 and the headwheel of the playback heads 122 and 124 are driven at appropriate rates. When the tape 100 is too advanced, the playback heads 122 and 124 stray too far to the left from their desired track centerline positions. Similarly, when the tape 100 is not advanced far enough, the playback heads are to the right of track centerline. One way to correct for this mistracking is to adjust position of the tape relative to the playback heads using the tape guide 40 of the present invention.

Figure 8:
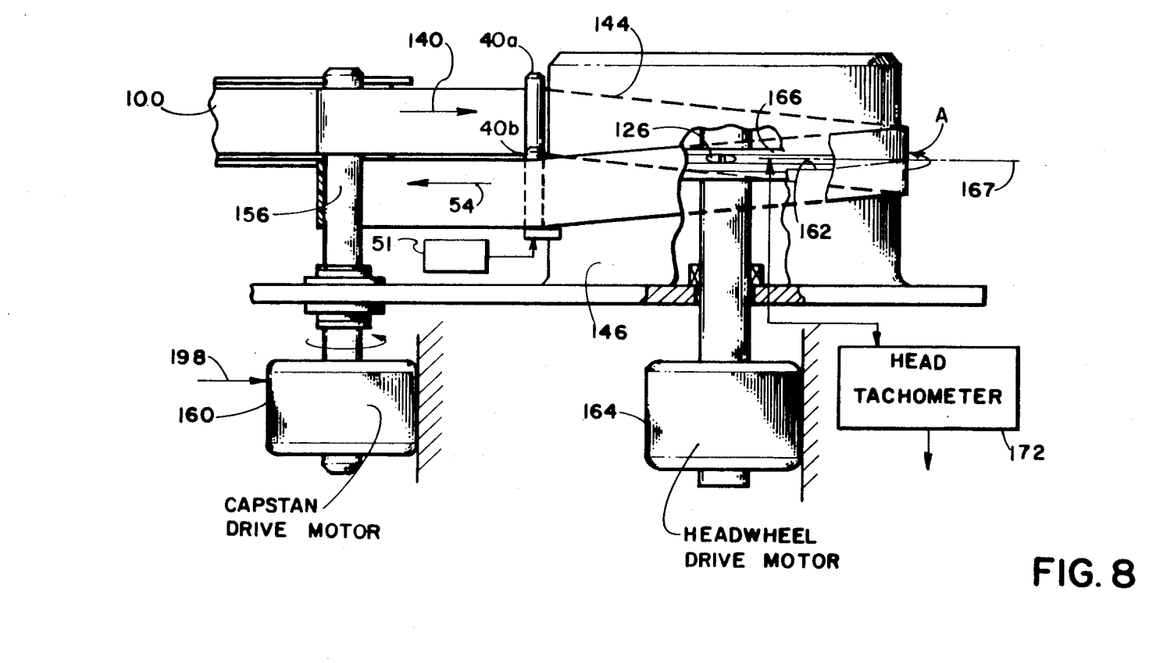
FIG. 8 illustrates the use of tape guide apparatus of the present invention with rotary transducer apparatus.

Referring now to FIG. 8, there is shown a pair of tape guides 40a and 40b in accordance with the invention, with basic components of slant track magnetic tape transport apparatus. The magnetic tape 100 is unwound from a reel (not shown) in the direction of the arrow 140. The first tape guide 40a is positioned to control the entrance point of the tape 100 with respect to two coaxially arranged drum sections 144 and 146. The magnetic tape 100 is then passed along a helical path adjacent the surfaces of the drum sections 144 and 146, through an angular range of approximately 180°. The second tape guide 40b is positioned to control the exit point of the tape 100 as it leaves the drum sections 144 and 146. The tape 100 is driven past the second tape guide 40b in the direction of an arrow 154 by a capstan 156, which is connected to a capstan motor 160. Thereafter, the tape 100 is taken up by a reel (not shown) which is similar to the aforementioned supply reel.

In order to effect the desired guidance along the helical path, the axes of the two tape guides 40a and 40b are skewed relative to the axis of the drum assembly, and also relative to the axis of the capstan 156. Also, because of the helical guidance of the tape 100 around the drum assembly, the tape guide 40a is offset upwardly from the tape guide 40b in the direction of the axis of the drum assembly.

The drum sections 144 and 146 are separated to form a circumferential gap 162. A motor 164 drives a headwheel 166, which is mounted at the center of the drums for rotation in an operational plane 167 in alignment with the gap 162. It is noted that the tape 100, while on the drum body, is transported relative to the plane 167 of the headwheel 166, in accordance with the illustrated arrangement of the tape guides 40a and 40b.

For its power, the motor 164 is connected to the output of a regulated power supply (not shown), which derives its power preferably from line voltage. A head tachometer 172, typically present in slant track record/playback apparatus, is employed so that the motor 164 drives the headwheel 166 at the appropriate speed. In particular, the so-called "once around" tachometer is suitable in this respect because it controls angular head position. Thus, the tachometer 172, upon each revolution of the transducer assembly, produces timing pulses which are compared with a reference signal for regulating the motor 164.

The playback heads 122 and 124 (not shown in FIG. 8) are mounted on the headwheel 166 so that they sweep across the tape 100 at different times. The track head 126 is mounted on the headwheel 166 midway between the two playback heads. All three heads are mounted on the circumferential edge of the headwheel 166, so that the tip of each head is in contacting relationship with the tape 100 as the headwheel 166 moves each head through 180°, past the tape 100 from one edge to the other. Preferably, the playback head 122 starts an operative sweep along the path of a record track, for example track 116, as the playback head 124 is just leaving the preceding track 114. At such time, the control head 126 is halfway across the tape, and thereby lags the head 124 by 90° and leads the head 122 by 90°. Similarly, the control head 126 comes into contact with the tape 100 when the playback head 124 is halfway across the tape, and leaves the tape when the playback head 122 is only halfway across the tape.

Figure 9:
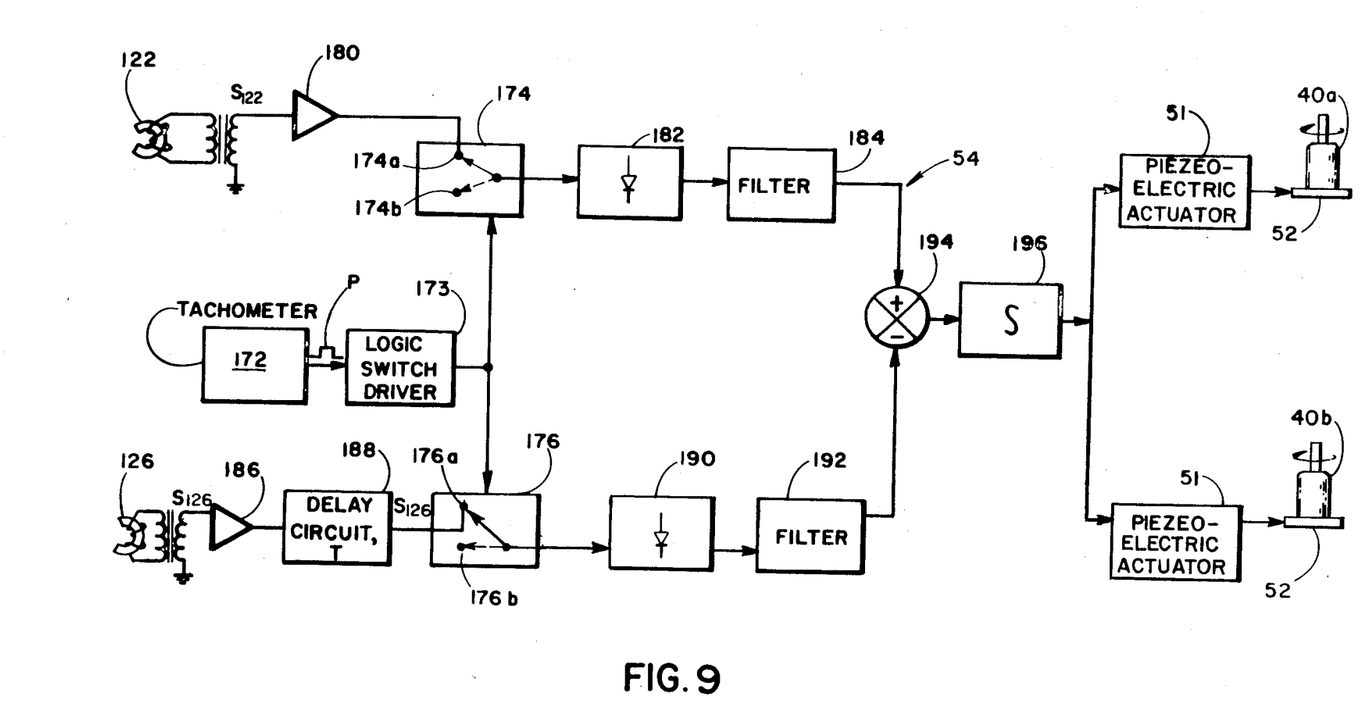
FIG. 9 is a schematic block diagram of circuitry associated with the tracking control apparatus of FIG. 6, for controlling the tape guide mechanism of the present invention.

There is shown in FIG. 9 a block diagram of the aforementioned control circuitry 54, for use with the tracking control apparatus of FIG. 6. In the circuitry of FIG. 9, means are provided for producing a control signal corresponding to when the playback head 122 begins its operative sweep across the tape 100. To this end, the aforementioned head tachometer 172 is used for producing an output timing pulse, P, in synchronism with the head 122 as it begins each pass across the tape 100.

A logic switch driver 173, which is timed by the output pulse P of the head tachometer 172, is arranged to operate a pair of electronic switches 174 and 176 in synchronism with each pass of the playback head 122. In doing so, the driver 173, in response to the output timing pulse of the tachometer 172, causes the switches 174 and 176 to close against their respective contacts 174a and 176a while the head 122 is moving across the tape 100. Similarly, the driver 173 maintains the switches 174 and 176 closed against their contacts 174b and 176b while the head 122 is off the tape 100.

In a rotary transducer apparatus operable, for example, at 1800 revolutions per minute, i.e. a period of 1/30 of a second, the switch driver 173 would accordingly cause the switches 174 and 176 to open and close each 1/60 of a second. Although the switches 174 and 176 are illustrated in the drawings as mechanical in nature, it will of course be clear to those skilled in the art that because the switches are electronic, the switching from one condition to the other condition occurs within a negligible interval.

A playback signal amplifier 180, receives the signal $S_{122}$, produced by the playback head 122. The amplifier 180 applies its output to rectifier circuitry 182. The purpose of the circuitry 182 is to produce an output that is a duplicate of the positive-going portion of its input $S_{122}$.

A low pass filter 184 receives the output of the rectifier circuitry 182. The purpose of the filter 184 is to provide a moving average of its input. This moving average provides a relatively smooth output of the positive-going portions of the signal $S_{122}$ as applied by the circuitry 182.

Reference is now to the circuit path followed by the signal, $S_{126}$, which is produced by the tracking control head 126. The signal $S_{126}$ is amplified by a signal amplifier 186 and applied to a delay circuit 188. The circuit 188 delays the amplified signal $S_{126}$ by an amount, T, and provides an identical but delayed output signal $S_{126}$. The delay T is equal to a time corresponding to the amount the tracking control head 126 leads the playback head 122, and is provided so that the delayed signal $S_{126}$ is contemporaneous with the signal $S_{122}$.

The switch 176, under the control of the switch driver 173, applies its output to rectifier circuitry 190. The purpose of the circuitry 190 is to produce an output that is a duplicate of the positive-going portion of its input $S_{126}$.

A low pass filter 192 receives the output of the rectifier circuitry 190. The filter 192, like the filter 184, produces a moving average of its input, to provide a relatively smooth output of the positive-going portion of the delayed signal $S_{126}$ as applied by the circuitry 190.

The outputs of the filter 184 and the filter 192 are applied respectively to the non-inverting and inverting terminals of a differential amplifier 194. The amplifier 194 functions as a substraction circuit, and thereby produces an output that is proportional to the output of the filter 184 minus the output of the filter 192. Accordingly, the output of the amplifier 194 is proportional to the difference between the positive-going portions of the signals $S_{126}$ and $S_{122}$.

The output of the amplifier 194 is integrated by an integrator 196. The output voltage from the integrator 196 represents a tracking-error signal which is proportional to the integral of the difference between the output of the filter 184 and the output of the filter 192. The magnitude of this error signal is proportional to the degree that the playback head 122 is displaced from track centerline 125. The sign of the error signal, i.e. positive or negative, represents the direction of the displacement.

The output of the integrator is applied to the piezoelectric actuators 51 of the tape guides 40. When the error signal is negative, the bimorph elements 52 are arranged to bend upwardly, thereby shifting the path of the tape 100 upwardly under the influence of their respective edge-guide elements 42. Conversely, when the error signal is positive, the elements 52 bend downwardly, to cause the path of the tape 100 to shift downwardly under the influence of the guide rollers 14. In the first case, the record tracks of the tape 100 are shifted to the left relative to the sweeps of their respective playback heads. In the latter case, the record tracks are shifted to the right relative to their playback heads.

When the magnetic tape 100 is advancing from the supply reel to the take-up reel, tracking control with the tape guides 40a and 40b is achieved under various tracking conditions as follows.

When the playback head 122 is aligned with a track centerline 125 of a +u record track, the tracking control head 126 overlaps that record track by an amount which is equal to the track width X of the playback head 122. In that condition, the amplitude of the delayed signal $S_{126}$ is approximately equal to the amplitude of the corresponding portion of $S_{122}$. The input to the integrator 196 is therefore approximately zero volts, so that the tracking-error signal voltage applied by the integrator to the tape guides 40 is negligible. Thus, the bimorph elements 52 are not energized to move their edge-guide elements 42, so that no lateral adjustment to the path of the tape 100 occurs.

When the magnetic tape 100 is misaligned so that the playback head 122 strays to the left of track centerline 125, as viewed in FIG. 6b, the head 126 overlaps the +u record track to a greater degree, in accordance with the tracking error of the head 122. This tracking condition causes the amplitude of the tracking control signal $S_{126}$ to increase in accordance with the amount that the playback head 122 has strayed to the left. Accordingly, the input to the inverting terminal of the substraction circuit 194 is greater than the input to the non-inverting terminal. The integrator 196 produces a negative-going tracking-error signal, which indicates that tape record track is too far to the right. The amplitude of the error signal is proportional to the distance that the head 122 has strayed from centerline 125, and thereby is related to the tracking error.

The piezoelectric elements 52 of the tape guides 40a and 40b, in response to a negative-going error signal, bend upwardly in accordance with the amplitude of the applied voltage. This bending movement causes their respective edge-guide elements 42 to move axially toward the corresponding guide rollers 14. Due to its rigidity and the yieldable nature of the roller 14, the tape 100 moves axially under the influence of edge-guide elements 42, thereby shifting the entrance and exit points of the path of the tape 100 upwardly relative to the drum assembly. Because of the upward movement of the tape 100, the length of the tape path between the tape guide 40a and the headwheel gap 162 increases slightly. This increase in tape path length has the same effect that momentarily decreasing the instantaneous speed of the tape would have. That is, the record track is shifted to the left relative to the instantaneous position of the playback head 122. By this relative movement, the head 122 moves from its position to the left to track the centerline 125.

A similar situation, but opposite in result, occurs when the playback head 122 strays to the right of track centerline 125, as shown in FIG. 4C. For this tracking condition, the tracking control head 126 overlaps the −u record track to a greater degree, and, of course, the +u record track to a lesser degree. Accordingly, the amplitude of $S_{126}$ is reduced, and the input to the inverting terminal of the substraction circuit 194 is less than the input to its non-inverting terminal. The amplitude of the error signal produced by the integrator 196 is again proportional to the tracking error, although this time the sign of the error signal is positive to indicate that the tracking error is in the opposite direction.

A positive error signal causes the piezoelectric elements 52 to bend downwardly, thereby pulling their respective edge-guide elements 42 in the axial direction away from the guide rollers 14. As this axial movement occurs, the guide rollers 14, cause the tape to move axially, to follow the edge-guide element 42, thereby maintaining the edge of the tape against the edge-guide elements.

With the downward movement of the tape 100, the length of the tape path from the tape guide 40a to the headwheel gap 162 decreases, thereby shifting the record track to the right relative to the position of the playback head 122. With this relative movement, the head 122 returns to track centerline.

With respect to slant track tape transport apparatus, the invention may of course be used to control the tape entrance point independently of the tape exit point. For example, the control circuitry 54 may be arranged so that the tape guide 40a responds to the tracking error signal during the first half of the sweep of a playback head across the tape, and the tape guide 40b responds to the tracking error signal during the second half of the sweep across the tape.

Furthermore, the tape guide mechanism, according to the invention, has general application to tracking control of any of a variety of signal recording formats and recording configurations. For example, the tape guide 40 may be used for tracking control of signals recorded on slant tracks, as disclosed, but may also be used for tracking control of transverse tracks or for tracking control of signals recorded on longitudinal tracks.

Curvature errors may be compensated for in slant track tape transport apparatus by adjusting the tilt angle of the tape guide mechanism at the tape entrance point. In the context of the scope of the invention, tilt angle may be adjusted by means of a piezoelectric actuator, responsive to a curvature error signal, for adjusting the angle of the corresponding tape edge-guide element 42 relative to the central axis of the tape guide 40a.

The invention has been disclosed in detail with reference to preferred embodiments thereof, but it will be understood that variations and modifications can be effected within the spirit and scope of the invention.

What is claimed is:

1. In a tape guide mechanism including an edge-guide element extending radially from a central axis of said tape guide mechanism, and a tape guide member, positioned axially from said edge-guide element and responsive to the wrapping of an advancing tape partially around said member, for applying an axial force to the advancing tape to move the tape laterally in the direction of said edge-guide element, to maintain a predetermined edge of the tape in continuous contact with a reference surface of said edge-guide element during tape transport movement, the improvement comprising:
   (a) said edge-guide element being mounted for axial movement relative to said tape guide member; and
   (b) energizable means having an output, coupled to said edge-guide element and arranged for movement in response to a voltage signal that is functionally related to a tape tracking error, for causing axial movement of said edge-guide element relative to said tape guide member in accordance with the movement of the output of said energizable means, whereby the tape is caused to move laterally in accordance with the movement of said edge-guide element.

2. A tape guide mechanism as claimed in claim 1 wherein the output of said energizable means is arranged for causing movement of said edge-guide element in a first axial directon toward said tape guide member, and in a second axial direction away from said tape guide member, and wherein said tape guide member and said energizable means are arranged with respect to each other to maintain the predetermined edge of the tape in contact with said reference surface during movement of said edge-guide element in both the first and second directions.

3. In a tape guide mechanism including an element having an edge-guide surface extending radially from a central axis of said tape guide mechanism, and a tape guide member, positioned axially from said element and responsive to the wrapping of an advancing tape partially around said member, for applying an axial force to the advancing tape to move the tape laterally in the direction of said element, to maintain a predetermined edge of the tape in continuous contact with said edge-guide surface of said element during tape transport movement, the improvement comprising:
   (a) said element being mounted for axial movement along said central axis relative to said tape guide member; and
   (b) piezoelectric means, coupled to said element and arranged for bending movement in response to a voltage signal that is functionally related to a tape tracking error, for causing axial movement of said element relative to said member in accordance with the bending movement of said piezoelectric means, whereby the tape is caused to move laterally in accordance with the movement of said edge-guide element.

4. A tape guide mechanism as claimed in claim 3 wherein said piezoelectric means comprises a bimorph element arranged (1) for bending movement in a first direction in response to a voltage signal of a first polarity, and (2) for bending movement in a second direction in response to a voltage signal of the opposite polarity.

5. A tape guide mechanism as claimed in claim 4 wherein said bimorph element is connected for causing axial movement of said edge-guide element in a direction in accordance with the direction of the bending movement of said bimorph element.

6. A tape guide mechanism as claimed in claim 4 including means, coupling said bimorph element to said edge-guide element and responsive to bending movement of said bimorph element, for causing movement of said edge-guide element in a composite direction having a first component which is perpendicular to the predetermined tape edge, and a second component which is parallel to the tape edge.

7. A tape guide mechanism as claimed in claim 6 wherein said element moving means maintains said edge-guide surface of said element normal to the tape during composite movement of said element.

8. A tape guide mechanism as claimed in claim 3 wherein said piezoelectric means comprises a stack of serially connected bimorph elements electrically connected in parallel to receive the voltage signal, to provide movement of the output of said piezoelectric means that is amplified in response to a given level of applied voltage.

* * * * *